United States Patent [19]

Udd

[11] Patent Number: 5,274,488
[45] Date of Patent: Dec. 28, 1993

[54] SECURE COMMUNICATIONS SYSTEM

[75] Inventor: Eric Udd, Huntington Beach, Calif.

[73] Assignee: McDonnell Douglas Corporation, Long Beach, Calif.

[21] Appl. No.: 880,685

[22] Filed: Jun. 11, 1986

[51] Int. Cl.$^5$ .......................................... H04B 10/02
[52] U.S. Cl. ..................... 359/119; 359/118; 359/122; 359/126; 359/156; 359/164; 359/173; 359/183; 359/188; 359/195
[58] Field of Search ............... 455/606, 615, 616, 605, 455/610, 612; 356/350; 367/149; 359/109, 111, 118, 119, 122, 126, 156, 164, 168, 173, 180, 183, 188, 189, 192, 195

[56] References Cited

U.S. PATENT DOCUMENTS

| | | | |
|---|---|---|---|
| 2,531,951 | 11/1950 | Shamos et al. | 455/616 |
| 2,707,749 | 5/1955 | Mueller | 455/616 |
| 3,366,792 | 1/1968 | Ohm | 455/616 |
| 3,408,498 | 10/1968 | Ohm | 455/616 |
| 3,495,189 | 2/1970 | Craw | 455/616 |
| 3,936,748 | 2/1976 | Bomke | 455/616 |
| 4,002,896 | 1/1977 | Davies et al. | 455/616 |
| 4,433,915 | 2/1984 | Hanse | 356/350 |
| 4,456,376 | 6/1984 | Carrington et al. | 356/350 |
| 4,456,377 | 6/1984 | Shaw et al. | 356/350 |
| 4,479,264 | 10/1984 | Lockett et al. | 455/606 |
| 4,482,980 | 11/1984 | Korowitz et al. | 455/606 X |
| 4,540,243 | 9/1985 | Fergason | 455/616 |
| 4,704,713 | 11/1987 | Haller et al. | 455/612 X |
| 4,727,601 | 2/1988 | Konishi | 455/612 |

Primary Examiner—Bernarr E. Gregory
Attorney, Agent, or Firm—Donald E. Stout; John P. Scholl

[57] ABSTRACT

There is provided by this invention a secure fiber optic communication system based on the Sagnac interferometer that allows multiple authorized users to communicate on the system by modulation and detection of two counterpropagating light beams. The security of the system is based on a combination of the information being modulated on the relative phase difference between the counterpropagating light beams and the low coherence length of the light source. In order for an intruder to intercept the signal, both counterpropagating beams must be accessed and the pathlength of the two beams matched to within a few coherence lengths of the light source so that an amplitude modulated output signal may be constructed. The system is further comprised of a random pathlength generator used to randomly vary the relative path length of the two counterpropagating beams. A light level alarm is provided that detects changes in the light level within the system. If the signal level changes sufficiently, the light level alarm shuts down the system.

18 Claims, 3 Drawing Sheets

SECURE COMMUNICATIONS SYSTEM

BACKGROUND OF THE INVENTION

1. Field of the Invention

This invention relates generally to fiber optic communication systems and, more particularly, to Sagnac interferometer based fiber optic systems that utilize counterpropagating light paths to form a fiber optic communications loop that may be accessed by a multitude of authorized users at predetermined data entry points.

2. Description of the Prior Art

The need for high bandwidth secure communication systems that are amenable to uses in networks and minimize the need for encryption is expected to become increasingly acute in the near future. Long-term trends for very high bandwidth sensors, computers, and multichannel video display capabilities will dictate this type of technology. The advent of fiber optics has opened up a new area where very high speed, low cost telecommunication is possible.

SUMMARY OF THE INVENTION

There is provided by this invention a Sagnac interferometer based secure communication system using a short, coherence length source in combination with counter propagating paths that have inherent self-matching characteristics to make an intrusion resistant telecommunications link. In one of the simplest forms of the Sagnac interferometer based secure communication system, light from a broadband light source such as a light emitting diode is directed into a beamsplitter. One part of the beam is directed toward a detector which monitors amplitude fluctuations of the light source. The other part of the light beam is directed through polarizing and spatial filter elements that are used to ensure that counterpropagating beams through the interferometer loop transverse the same path. The light beam that is conditioned by these elements is coupled int counter-propagating light beams in the interferometer loop by a second beamsplitter. Data is impressed upon the counterpropagating light beams by modulating their relative phase. When the two beams of light recombine on the second beamsplitter, their difference in phase causes the light beam that returns via the polarizing and spatial filter elements to be amplitude modulated. When the combined beams return to the first beamsplitter, a portion of this amplitude modulated light beam is directed into a detector which converts to light signal into a amplitude modulated electrical signal corresponding to the data impressed onto the light beam. The light source, beamsplitter, beam conditioning optics, detector and associated support electronics constituted the receiver for the system. The optical and electrical support elements used to impress the relative phase difference between the counterpropagating light beams is the transmitter for the system.

The security of the system is based on a combination of the information being impressed on the relative phase difference between the counterpropagating light beams and the low coherence length of the light source. In order for an intruder to intercept the signal, both counterpropagating beams must be accessed and the pathlength of the two beams matched to within a few coherence lengths of the light source so that an amplitude modulated output signal may be constructed. Since the counterpropagating pathlengths may differ by kilometers at the point of interception and the coherence length of a low coherence light source such as light emitting or superradiant diode may be on the order of 30 microns, this is an extremely difficult and time consuming task analogous to finding a needle in a haystack. What makes this system extremely secure is that a random pathlength generator is used to randomly vary the relative pathlength of the two counterpropagating beams. This is equivalent to having the needle in the haystack moved randomly throughout the haystack. In the unlikely event the intruder manages to achieve the pathlength matching condition a new equally difficult pathlength condition chosen totally at random occurs a short time later. The situation is analogous to luckily stumbling on the needle in the haystack only to have it hidden once again at some random location in the haystack an instant later.

It is an object of this invention to provide a secure single mode optical fiber communication link having very high bandwidths, such that long repeaterless links are possible.

It is an object of this invention to use low cost single mode fiber telecommunication technology. It is another object of this invention to provide a system that is amendable to uses by multiple users and networking arrangements. It is an object of this invention to send information at high data rates, using frequency shifters, phase modulators, tap-resistant single mode fibers, random optical pathlength generation, and random amplitude modulation of the system light source to prevent unauthorized intrusions. It is an object of this invention to provide flexible secure communication systems that offer adequate security at the lowest possible cost.

BRIEF DESCRIPTION OF THE PREFERRED EMBODIMENT

Figure 1:
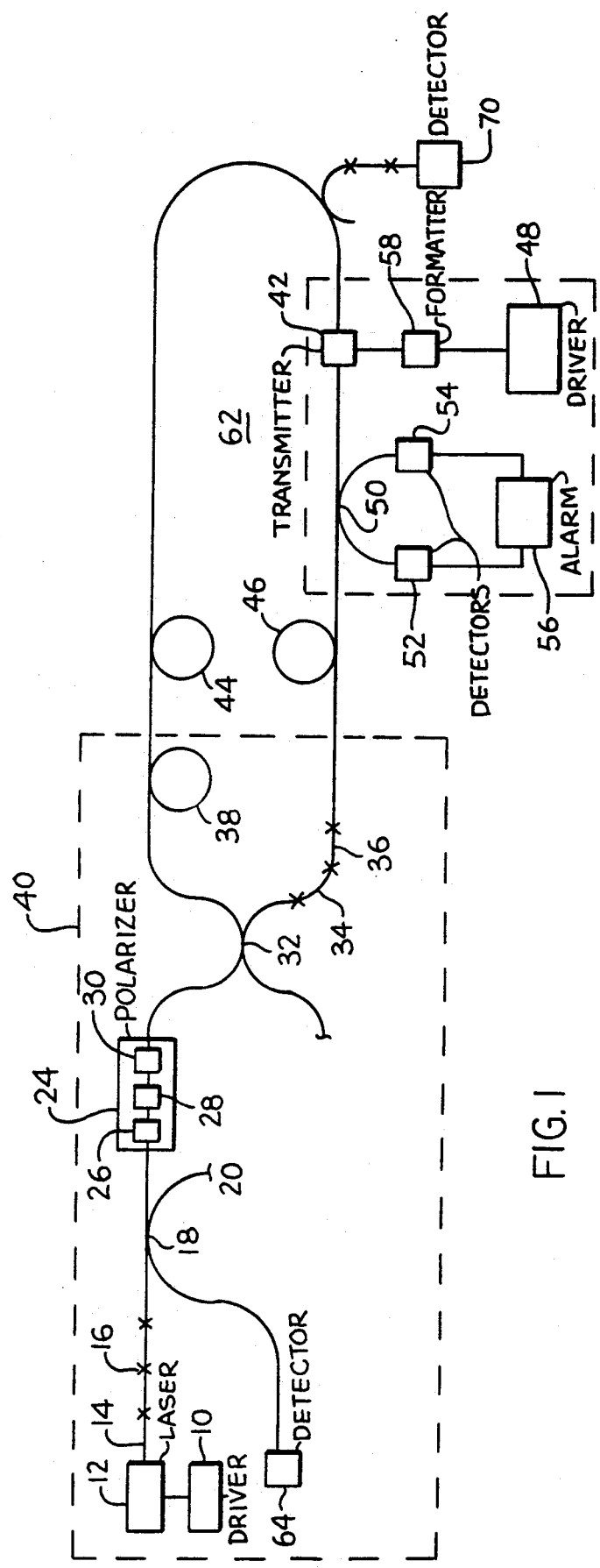
FIG. 1 is a schematical representation of a fiber optic communication system based on the Sagnac interferometer that incorporates the principles of this invention.

A simple Sagnac interferometer based secure communication system may be constructed using GaAs technology and single mode optical fiber at the 0.8 m wavelength as shown in FIG. 1. A light source driver circuit 10 is used to power a superradiant diode 12 which couples approximately 200 watts of optical power into a pigtailed singled mode optical fiber 14. A pigtailed light source of this type is sold by General Optronics. The fiber end of 14 is coupled into a intensity maintenance unit 16 and a single mode fiber beamsplitter 18. The intensity maintenance unit 16 consists of a one-half meter and two meter length of Corning polarization preserving fiber that are spliced together at 45 degrees with respect to their polarization preserving axis by an epoxy splice supplied by TRW. After the light beam has been scrambled in polarization, it enters the beam splitter 18. The light beam is then split into a light beam that exits via the terminated end 20. The end 20 of the beamsplitter is terminated by crushing the end and putting it in UV curable cement. The other end 22 is coupled to a polarizing element 24. The polarizing element 24 consists of a graded index lens 26 that is used to collimate the light beam which is then polarized by passage through a Glan-Thompson polarizer 28 and focused back into the single mode optical fiber circuit by the graded index lens 30. The polarized light beam then reaches the second beamsplitter 32 and is split into counterpropagating light beams. Intensity maintenance elements 34 and 36, which are similar in construction to element 16, are placed in the loop to avoid signal fade out and minimize environmental effects. A random pathlength generator 38 that consists of a fiber wound about a piezoelectric mandril completes the input optics for the receiver 40. The phase modulator type transmitting/sending station 42 is separated from the receiver 40 by a 1.4 Km length of single mode fiber 44 and a 1.0 Km length of single mode fiber 46. After passage through the fiber coils 44 and 46, the counterpropagating light beams reach the phase modulator 42 where relative phase differences between the counterpropagating light beam are impressed.

The phase modulator 42 consists of approximately two meters of optical fiber wrapped around a 2.54 cm. diameter piezoelectric cylinder. Signals are impressed on the phase modulator by the frequency synthesizer 48 which may be a Hewlett Packard model 8662A. A 90/10 percent fiber beamsplitter 50 is used to monitor the performance of the phase modulator 42 for extraneous polarization or amplitude modulator and as part of an alarm system that consists of the detectors 52 and 54 in combination with a rationing alarm system 56 that looks for changes in the relative power of the counterpropagating beams as well as their absolute value in light power. A data data formatter 58 cooperates with the driver 48 to condition and format the intelligence signal modulated by the phase modulator 42. After passage through the fiber loop 62 the two counterpropagating beams are directed back through the polarizing element 24, the beamsplitter 18, and recombine onto the detector 64 as an amplitude modulated signal.

Figure 2:
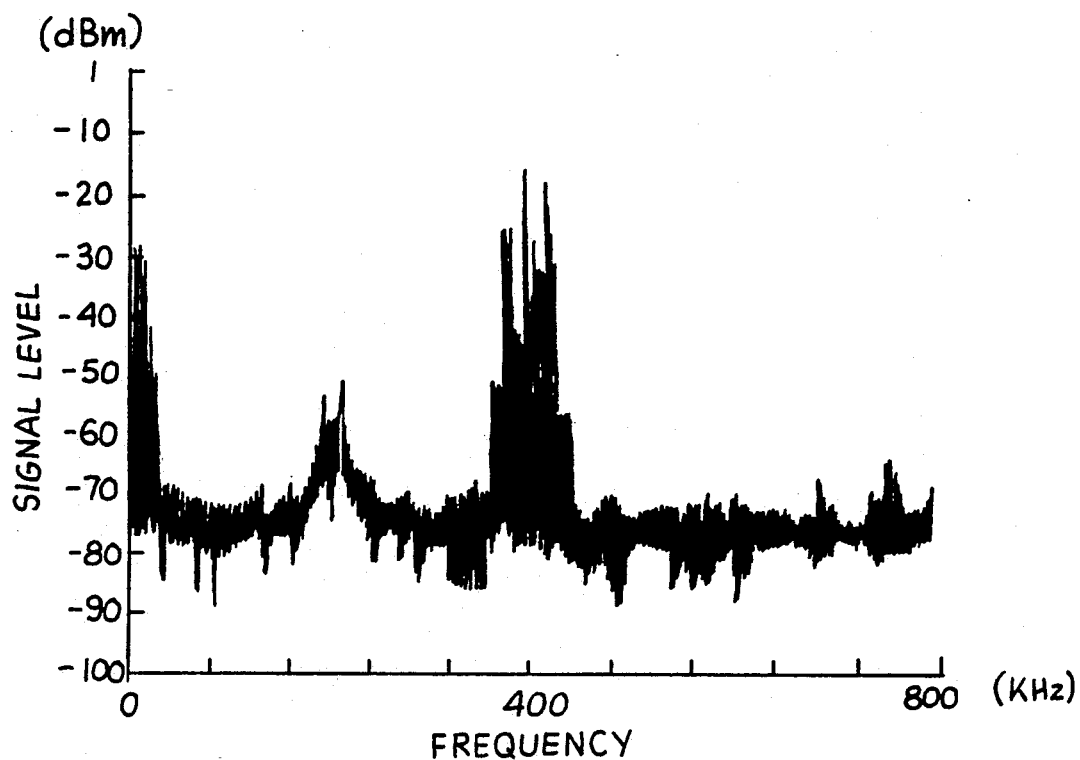
FIG. 2 illustrates the communication system output when a 200 khz frequency is frequency modulated at 5 khz on the phase modulator.

FIG. 2 illustrates the detector 64 output when a 200 khz frequency is frequency modulated at 5 khz on the phase modulator 42. The output of the detector 64 is first amplified before displayed on a spectrum analyzer 66 such as a Hewlett Packard 8568A. When the phase modulator is modulated continuously at the carrier frequency f, the signal on the detector 64 has a dominant carrier frequency at 2f (or any other even harmonic of f). Using 2f or any other even harmonic of f as the output carrier has the advantage of good environmental stability since environmental perturbations such as temperature gradients and acoustics will no strongly effect the output at f and odd harmonics of f. Data may thus be transmitted using frequency modulation of the carrier f at the phase modulator 42 which is demodulated about the output carrier frequency 2f.

Figure 3:
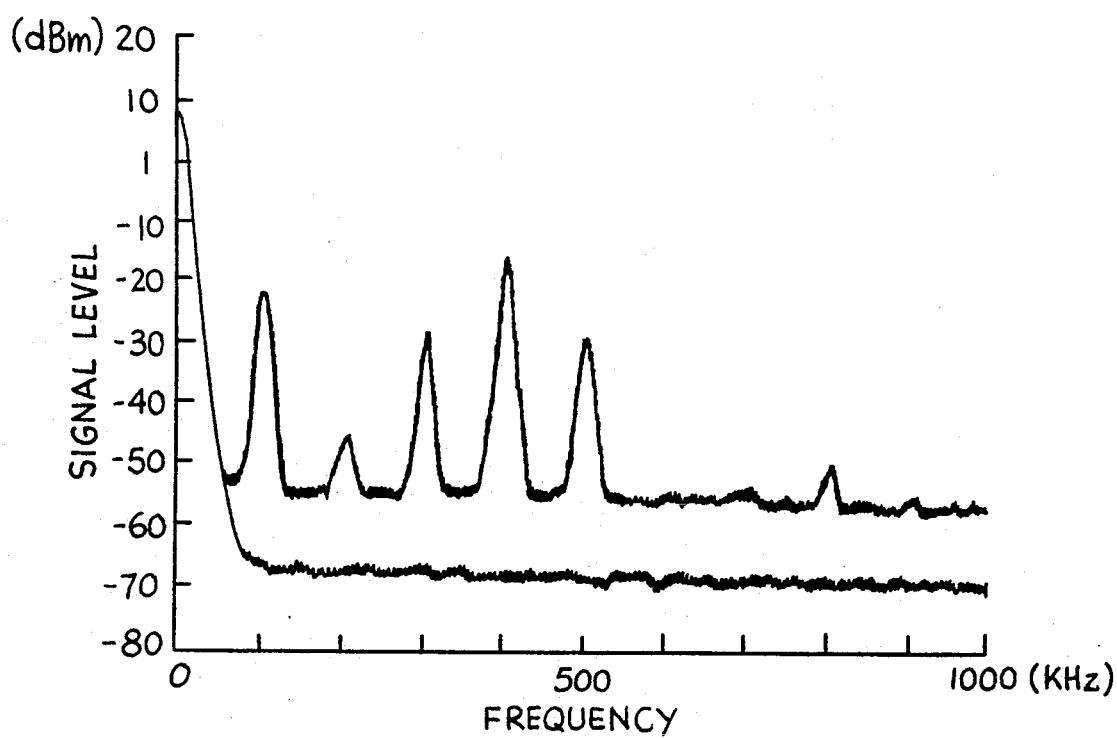
FIG. 3 illustrates the output obtained by amplitude modulating the carrier frequency where a signal at 200 khz is impressed on the phase modulator with thirty (30) percent amplitude modulation at 100 khz.

In FIG. 3 similar results were obtained by amplitude modulating the carrier frequency f where a signal at 200 khz is impressed on the phase modulator 42 with thirty (30) percent amplitude modulation at 100 khz. The output signal at 400 khz and the resulting sidebands are used for demodulation. In order to show the system security, the detector output signal from the tap 70 was demodulated as shown on the lower trace of FIG. 3 that is displaced 10 db down from the upper data trace for visibility. No discernable signal is present.

Figure 4:
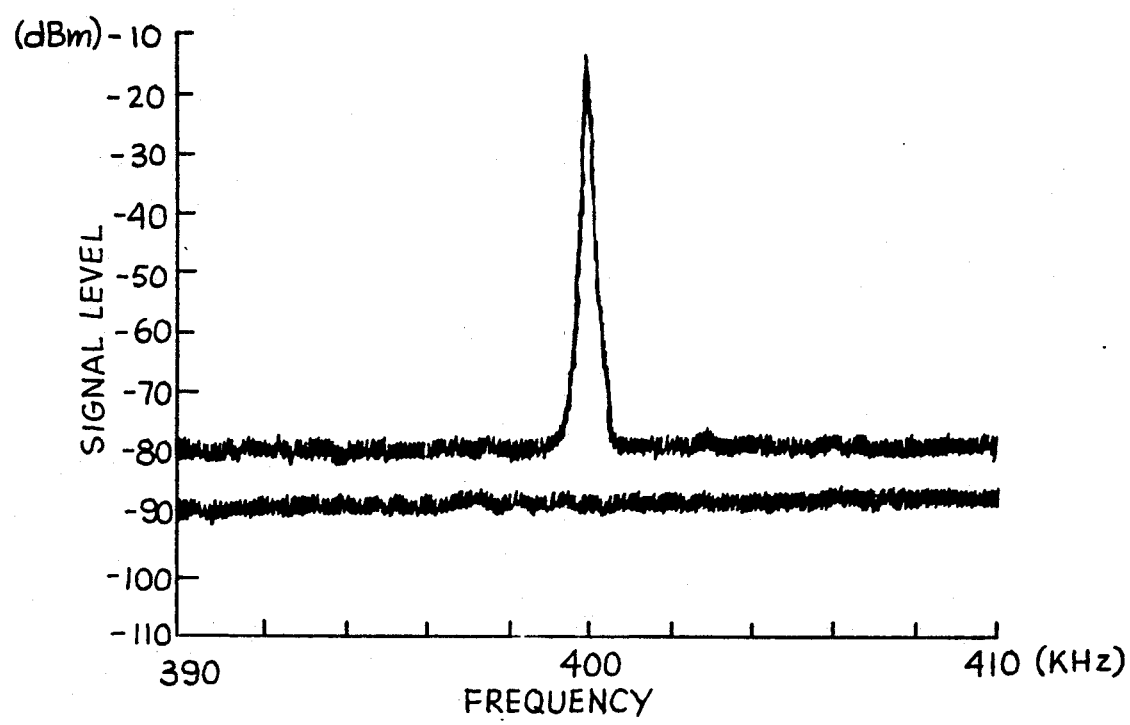
FIG. 4 illustrates the detector output from a tap into the communication system at the carrier frequency.

FIG. 4 illustrates the detector output from the tap 70 at the carrier frequency with better resolution. Again, no detectable polarization or amplitude modulation modulation can be detected. The corresponding signal level at the second harmonic of f at the detector 42 was several hundred microvolts, so the separation between the secure signal and tapable signal is at least on the order of five orders of magnitude for the system.

It can readily be seen that there is provided by this invention a novel fiber optic communications system based on the principles of the Sagnac interferometer that is intrusion resistant and can be accessed by a multitude of authorized users.

Although there has been illustrated and described specific detail and structure of operation, it is clearly understood that the same were merely for purposes of illustration and that changes and modifications may be readily made therein by those skilled in the art without departing from the spirit and scope of this invention.

What is claimed is:

1. A fiber optic communication system, comprising:
   a) a light source means for inputting a beam of light into a first optical fiber;
   b) a first beamsplitter means connected to the first optical fiber having one output connected to a detector and a second output connected to a polarizing means for polarizing the optical output of the first beamsplitter means;
   c) a second beamsplitter means connected to the output of the polarizing means for splitting the light beam into counterpropagating beams, having one end of an optical fiber loop connected to one output of the beamsplitter means for receiving a light beam propagating in a clockwise direction and the other end of the optical fiber loop for receiving a light beam propagating in a counterclockwise direction;
   d) a signaling means connected to the optical fiber loop for modulating an intelligence signal on the counterpropagating light beams including a random pathlength generating means in a series relationship to the signal means for randomly changing the path length of the optical fiber loop; and
   e) an electrical circuit means connected to the detector for demodulating the light beams detected thereon to receive the intelligence signal.

2. A fiber optic communications system as recited in claim 1 wherein the optical polarizer is generally comprised of a first graded index lens for collimating the light beam through a Glan-Thompson polarizer and a second graded index lens for focusing the light beam back into the single mode optical fiber circuit.

3. A fiber optic communication system as recited in claim 1 wherein the signaling means is generally comprised of a data formatter and driver means for impressing data on the counterpropagating light beams.

4. A fiber optic communications system as recited in claim 3 wherein a polarization preserving optical fiber is connected in a series relationship with the light source and the first beamsplitter means.

5. A fiber optic communication system as recited in claim 3 wherein the signaling means is further comprised of light level alarm system for detecting changes in the amplitude of the counterpropagating light beam whereby the data formatter and driver means is shut down at a predetermined low light level limit.

6. A fiber optic communication system as recited in claim 5 wherein the light level alarm system is further comprised of color filtering means for attenuating all wavelength bands except the predetermined wavelength of the counterpropagating light beams.

7. A fiber optic communications system as recited in claim 3 wherein an optical fiber spatial filter is connected in a series relationship with the polarizer and the second beamsplitter means.

8. A fiber optic communication system as recited in claim 1 wherein the random pathlength generating means is comprised of an optical fiber wrapped around a voltage driven piezoelectric mandril for changing the fiber length as the voltage changes.

9. A fiber optic communication system as recited in claim 1 wherein the random pathlength generating means is comprised of an optical switching means for periodic switching between a pair of parallel connected optical fibers wrapped around voltage driven piezoelectric mandrils for changing their respective fiber length as their respective voltages changes.

10. A fiber optic communication system as recited in claim 9 wherein the signaling means for modulating an intelligence signal on the counterpropagating light beams are phase modulators.

11. A fiber optic communication system as recited in claim 10 wherein the signaling means for modulating an intelligence signal on the counterpropagating light beams are transducers means deposited directly on the optical fiber loop for oscillation by a driver.

12. A fiber optic communication system as recited in claim 10 wherein the signaling means for modulating an intelligence signal on the counterpropagating light beams is an optical fiber wrapped around a voltage driven piezoelectric mandril for changing the fiber length as the voltage changes.

13. A fiber optic communication system as recited in claim 10 wherein the signaling means for modulating an intelligence signal on the counterpropagating light beams is an integrated optical phase modulator.

14. A fiber optic communications system as recited in claim 10 wherein a plurality of signaling means are connected to the optical fiber loop, each for modulating an intelligence signal on the counterpropagating light beams.

15. A fiber optic communication system as recited in claim 9 wherein the signaling means for modulating an intelligence signal on the counterpropagating light beams are frequency shifters.

16. A fiber optic communications system as recited in claim 15 wherein a plurality of signaling means are connected to the optical fiber loop, each for modulating an intelligence signal on the counterpropagating light beams.

17. A fiber optic communication system as recited in claim 9 wherein the signaling means for modulating an intelligence signal on the counterpropagating light beams are acousto-optic modulators.

18. A fiber optic communications system as recited in claim 1 wherein an intensity maintenance means for scrambling the polarization states of light propagating through the system is connected to the polarizing means in a series relationship.

* * * * *